(12) United States Patent
Dorbessan

(10) Patent No.: US 12,039,755 B2
(45) Date of Patent: Jul. 16, 2024

(54) METHOD AND DEVICE FOR PASSIVE RANGING BY IMAGE PROCESSING AND USE OF THREE-DIMENSIONAL MODELS

(71) Applicant: MBDA France, Le Plessis-Robinson (FR)

(72) Inventor: Paul Dorbessan, Le Plessis-Robinson (FR)

(73) Assignee: MBDA France, Le Plessis-Robinson (FR)

( * ) Notice: Subject to any disclaimer, the term of this patent is extended or adjusted under 35 U.S.C. 154(b) by 392 days.

(21) Appl. No.: 17/619,642

(22) PCT Filed: May 26, 2020

(86) PCT No.: PCT/FR2020/050875
§ 371 (c)(1),
(2) Date: Dec. 16, 2021

(87) PCT Pub. No.: WO2020/260782
PCT Pub. Date: Dec. 30, 2020

(65) Prior Publication Data
US 2022/0351412 A1 Nov. 3, 2022

(30) Foreign Application Priority Data

Jun. 26, 2019 (FR) ...................................... 1906854

(51) Int. Cl.
*G06T 7/73* (2017.01)
*G06V 10/70* (2022.01)
*G06V 10/764* (2022.01)
(52) U.S. Cl.
CPC ................ *G06T 7/75* (2017.01); *G06V 10/70* (2022.01); *G06V 10/764* (2022.01); *G06T 2207/20084* (2013.01); *G06T 2207/30212* (2013.01)

(58) Field of Classification Search
CPC ............. G06T 7/75; G06T 2207/20084; G06T 2207/30212; G06T 2207/10004; G06V 10/70; G06V 10/764
See application file for complete search history.

(56) References Cited

U.S. PATENT DOCUMENTS 9,300,946 B2 * 3/2016 Do ........................ H04N 13/257
9,361,660 B2 * 6/2016 Tanaka ...................... G06T 1/00
(Continued)

OTHER PUBLICATIONS

International Search Report issued in corresponding International Patent Application No. PCT/FR2020/050875 dated Sep. 15, 2020.

*Primary Examiner* — John B Strege
(74) *Attorney, Agent, or Firm* — Morgan, Lewis & Bockius LLP

(57) ABSTRACT

The device (1) for estimating the distance between an observer (2) and a target (4) using at least one image generated by a digital image generator (6) from the position (P1) of the observer (2) comprises a detection and identification unit configured to detect and identify a target (4) in the image and define an imaged representation of the target (4), and a distance estimation unit configured to perform, on the image, multiple different projections of a three-dimensional model of the target (4) to obtain projected representations of the target (4) and to select the projected representation most similar to the imaged representation, the distance associated with the selected projected representation representing the estimated distance (D) between the position of the observer (2) and the target (4).

14 Claims, 4 Drawing Sheets

(56) References Cited

U.S. PATENT DOCUMENTS

| | | | |
|---|---|---|---|
| 11,170,561 B1* | 11/2021 | Baker | G06T 15/205 |
| 2010/0092079 A1 | 4/2010 | Aller | |
| 2012/0262455 A1* | 10/2012 | Watanabe | G06T 7/75 345/420 |
| 2019/0147221 A1 | 5/2019 | Grabner et al. | |
| 2023/0057655 A1* | 2/2023 | Du | G01S 17/894 |

* cited by examiner

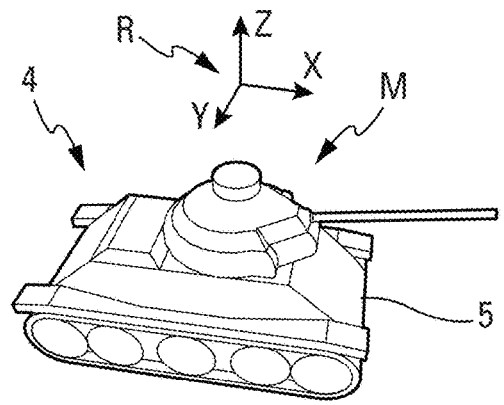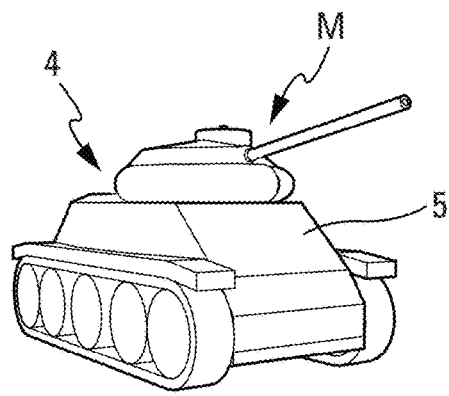
Fig. 6A  Fig. 6B
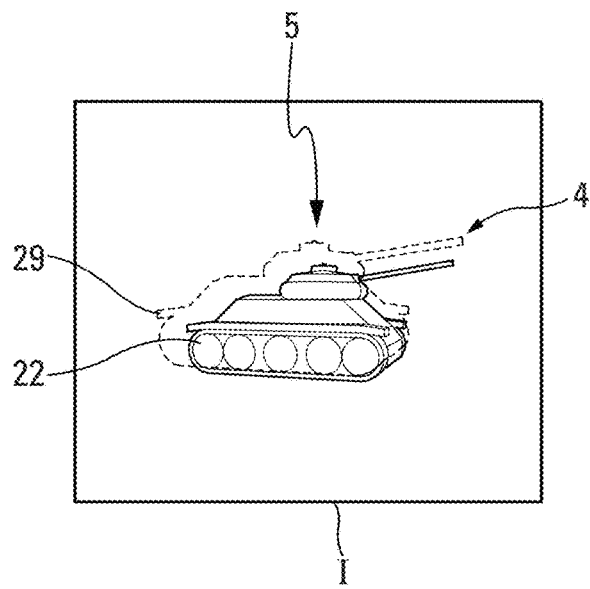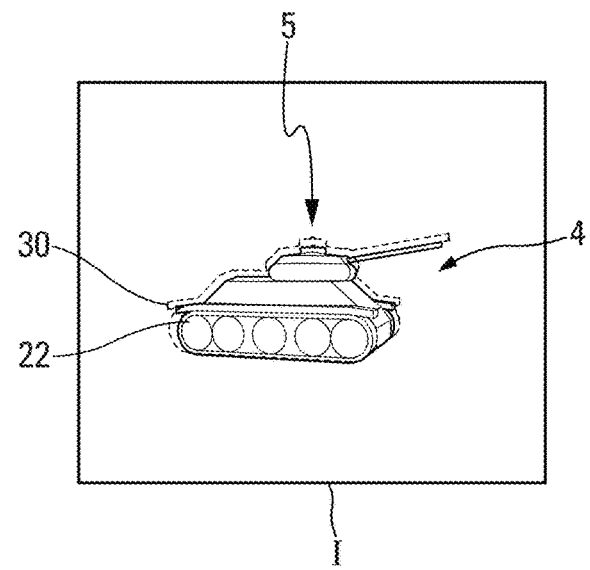
Fig. 7  Fig. 8

METHOD AND DEVICE FOR PASSIVE RANGING BY IMAGE PROCESSING AND USE OF THREE-DIMENSIONAL MODELS

TECHNICAL FIELD

The present invention relates to a method and device for estimating the distance (or ranging) between an observer and a target, using at least one image generated by a digital image generator.

Although not exclusively, the present invention is particularly applicable to the military field. In the military field, the estimation of the distance of a target or a threat (relative to the observer) is very important. It is of particular interest:

for the tactical intelligence (relative position of a target with respect to the observer);
for the progression (maintaining a safe distance); and
for the engagement of a munition (shell or missile fire).

PRIOR ART

In the scope of the present invention, a target is any object, for example a building or a vehicle, or any other element, whose distance is to be measured.

Different systems, based on different and various technologies, are known to measure the distance between an observer and a target, i.e. between the position of the observer and that of the target.

In particular, methods based on the analysis of a light signal emitted by the observer and reflected by the observed target are known. Such a method exists in active systems such as a laser rangefinder, a 3D scanner, a lidar or time-of-flight cameras. The distance measurement is performed by different analyses, implemented in these systems, such as the delay measurement of the echo of the emitted signal, the measurement of the phase shift between the emitted and reflected signals, the measurement of a frequency modulation, and the measurement of the decrease of the intensity of the reflected signal.

All the active methods have disadvantages in terms of stealth. Indeed, they require the emission of an electromagnetic radiation towards the observed target. This radiation is detectable, which is not desirable in some applications. In addition, it requires specific active equipment, which may be expensive.

There are also passive methods, in particular focusing methods of a shallow depth of field imager. Such a method requires a specific equipment that is poorly adapted to other uses that could be envisaged with the same optical device, such as the observation or the surveillance of an area.

Other passive methods based on triangulation also have disadvantages. A typical device uses generally two imagers, which is problematic in terms of cost and space requirements. In addition, the performance is directly related to the distance between the two imagers, which is particularly unfavorable for the space requirements. A variant with a single moving imager requires the observer to move, which is not always possible.

These usual solutions are therefore not completely satisfactory.

The object of the present invention is to provide a particularly advantageous passive distance measurement (or ranging).

DESCRIPTION OF THE INVENTION

The present invention relates to a method for estimating a distance between a position of an observer and a target, using at least one image generated by a digital image generator (or imager or camera) from the position of the observer, which allows to remedy the aforementioned disadvantages.

To this end, according to the invention, said distance estimation method comprises a sequence of steps comprising:

a detection and identification step consisting in detecting and identifying at least one target in the image, from at least one (predetermined) list of known targets, and defining an imaged representation of the identified target; and a distance estimation step, the distance estimation step comprising a projection sub-step consisting in performing, on the image, a plurality of different projections of a three-dimensional model of said identified target in order to obtain projected representations of the target, said projected representations depending on characteristics of the image generator, more particularly the spatial resolution of the image generator, each of said projected representations being representative of an associated distance of the target and an associated orientation of the target, a comparison sub-step consisting in comparing the imaged representation of the target to each of said projected representations, and a selection sub-step consisting in selecting the projected representation most similar to the imaged representation, the distance associated with that selected projected representation representing said estimated distance between the position of the observer and the target.

Thus, thanks to the invention, a method is obtained which allows to estimate, automatically and without contact, the distance separating an object (target) and an observer, without the latter having to move, and this by means of an optical system (image generator) which is passive, i.e. which does not emit electromagnetic waves in the direction of the target to interact with it.

In a preferred embodiment, the detection and identification step comprises:

a detection sub-step consisting in detecting a target in the image; and a recognition and identification sub-step consisting in assigning a class to the detected target. Preferably, said class is one of the following classes: a recognition class, an identification class. The attribution of a class corresponds to the determination of a category; if this category is generic (for example, a truck or a tank) we speak of recognition and when it allows the identification of a precise model of the object (for example a particular model of tank) we speak of identification.

Advantageously, the detection sub-step consists in performing one of the following operations on the image: identifying the pixels of the target, identifying the pixels of the outline of the target, generating a bounding box encompassing the target. A learning technique for the detection can be used advantageously (but not necessarily and independently of the identification models).

In addition, advantageously, the detection and identification step implements a machine learning using classification models.

Advantageously, the method comprises at least one learning step, implemented prior to the detection and identification step, consisting in generating said classification models. Further, in a particular embodiment, said learning step implements one of the following algorithms:

at least one support vector machine algorithm;

at least one algorithm based on a decision tree forest;
at least one convolutional neural network.

Furthermore, in a preferred embodiment, the comparison sub-step consists in assigning a score to each of said projected representations, according to the quality of the match (measured by a similarity measure between the imaged representation and the projected representation), and the selection sub-step consists in selecting the projected representation with the best score. Advantageously, the quality of the match corresponds to the measure of the integration along the projected outline of the distance between the outline of the imaged representation and the outline of the projected representation.

Furthermore, advantageously, said three-dimensional models of targets are geometric representations of the targets as polygons in space. Advantageously, the method comprises at least one generation step, implemented prior to the detection and identification step, consisting in generating said three-dimensional models.

In a particular embodiment, the method further comprises at least one of the following steps:
an image generation step, implemented prior to the detection and identification step, consisting in generating at least one image using the image generator from the position of the observer;
an information transmission step, implemented after the distance estimation step, consisting in transmitting at least the estimated distance to at least one user system.

The method can be implemented in two different ways. Specifically:
in a first embodiment, it is implemented (fully) automatically; and
in a second embodiment, the detection and identification step is implemented semi-automatically (with an intervention of an operator), and the distance estimation step is implemented automatically.

In this second embodiment, it is envisaged that the operator can independently intervene on the segmentation of the object and on the identification class of the object, using a man/machine interface (for example a software with a graphic interface implemented on a touchscreen or with a cursor). For example, the operator helps the device to draw the outlines of the object, or he informs the device the type of object he has extracted from the image (e.g. a tank of a given type).

The present invention also relates to a device for estimating the distance between a position of an observer and a target, using at least one image generated by a digital image generator from the position of the observer.

According to the invention, said (distance estimation) device comprises:
a detection and identification unit configured to detect and identify at least one target in the image, from at least one list of known targets, and to define an imaged representation of the identified target; and
a distance estimation unit configured to:
perform, on the image, a plurality of different projections of a three-dimensional model of said identified target to obtain projected representations of the target, the projected representations being dependent on characteristics of the image generator, more particularly the spatial resolution of the image generator, each of said projected representations being representative of an associated distance from the target and an associated orientation of the target;
compare the imaged representation of the target with each of said projected representations; and
select the projected representation most similar to the imaged representation, the distance associated with this selected projected representation representing said estimated distance between the position of the observer and the target.

Further, in a particular embodiment, said device also comprises at least one of the following elements:
at least one predetermined database containing at least said list of known targets and/or said three-dimensional models;
the digital image generator configured to generate at least one image from the position of the observer;
an information transmission unit configured to transmit at least the estimated distance to at least one user system.

BRIEF DESCRIPTION OF FIGURES

The figures of the attached drawing will make it clear how the invention can be carried out. In these figures, identical references designate similar elements.

FIGS. 6A and 6B are two different perspective views of a target representing a tank, intended to form a three dimensional model.

FIG. 7 shows an example of comparison between an imaged representation of a target and a first projected representation.

FIG. 8 shows another example of comparison between the imaged representation of a target and a second projected representation.

DETAILED DESCRIPTION

The distance estimation device 1 (hereinafter "device") shown schematically in FIG. 1 and allowing to illustrate the invention is intended at least to estimate the distance between a position of an observer and a position of a target. The observer is preferably a human being, but it can also be a technical system that comprises in particular a digital image generator.

Figure 2:
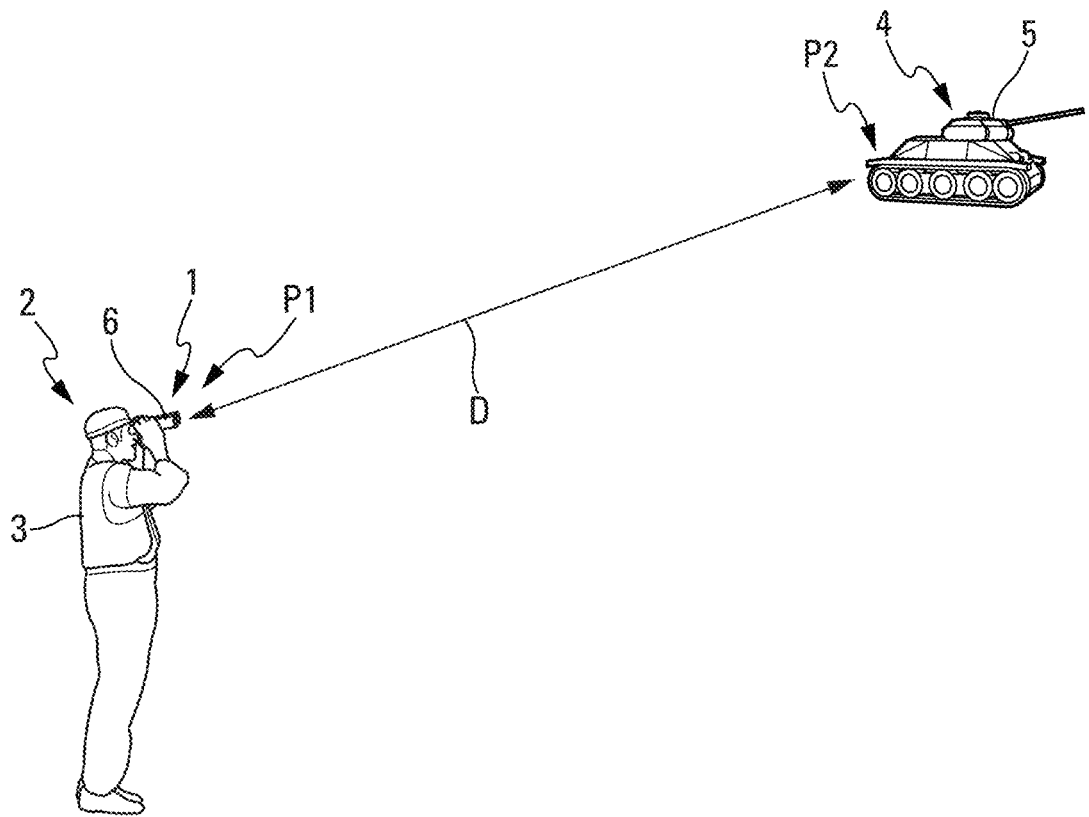
FIG. 2 shows a particular application of a distance measurement of a target.

Target 4 means any object, e.g. a building, a mobile or non-mobile vehicle or any other element, the distance of which is to be measured (relative to the observer 2). In the example shown in FIG. 2, illustrating a particular application, the observer 2 is a soldier 3 and the target 4 is a tank 5. Although particularly suitable for the military field, the device 1 can also be used in the civilian field.

Figure 3:
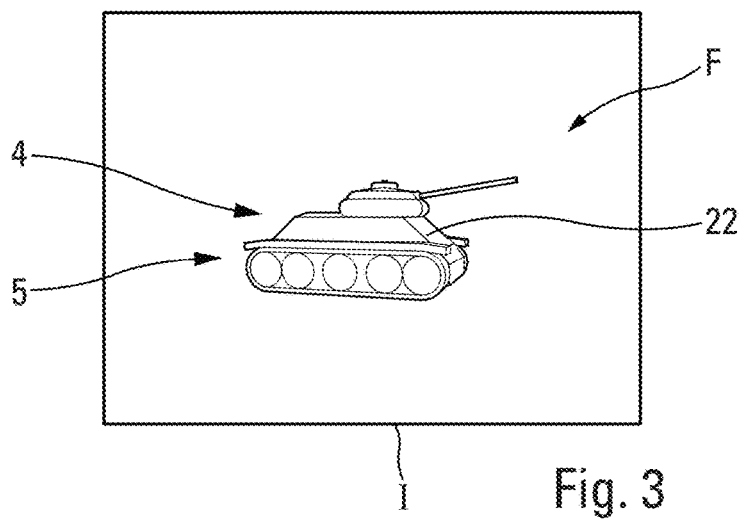
FIG. 3 shows schematically an image taken by a digital image generator, of a scene containing a target.

The device 1 is intended to estimate the distance with the aid of at least one image I (FIG. 3) generated by a digital image generator 6 (or imager or camera) from the position of the observer 2, in particular by implementing a processing of this image I. The image generator 6 which took the image I may be activated (and triggered) by the observer 2 or by another person or by an appropriate system.

More precisely, the device 1 is intended to estimate the distance D between the current position P1 of the observer 2 (from which the image I was taken) and the current position P2 of the target 4, as shown in FIG. 2. The current positions P1 and P2 are the geographical positions of the observer 2 and of the target 4 at the time the image I (used for the estimation) is taken by the image generator 6.

For the implementation of the invention, technical characteristics of the image generator 6 are known, and in particular the spatial resolution of said image generator 6, namely the angular value of the angle of view (or viewing angle) in the reality which corresponds to the length of a pixel in the image I generated by said image generator 6.

In the scope of the present invention, the observer 2 and/or the target 4 do not need to be mobile to implement the distance estimation. However, the observer 2 may be movable or stationary, and the target 4 may be movable or stationary, for the implementation of the present invention.

Figure 1:
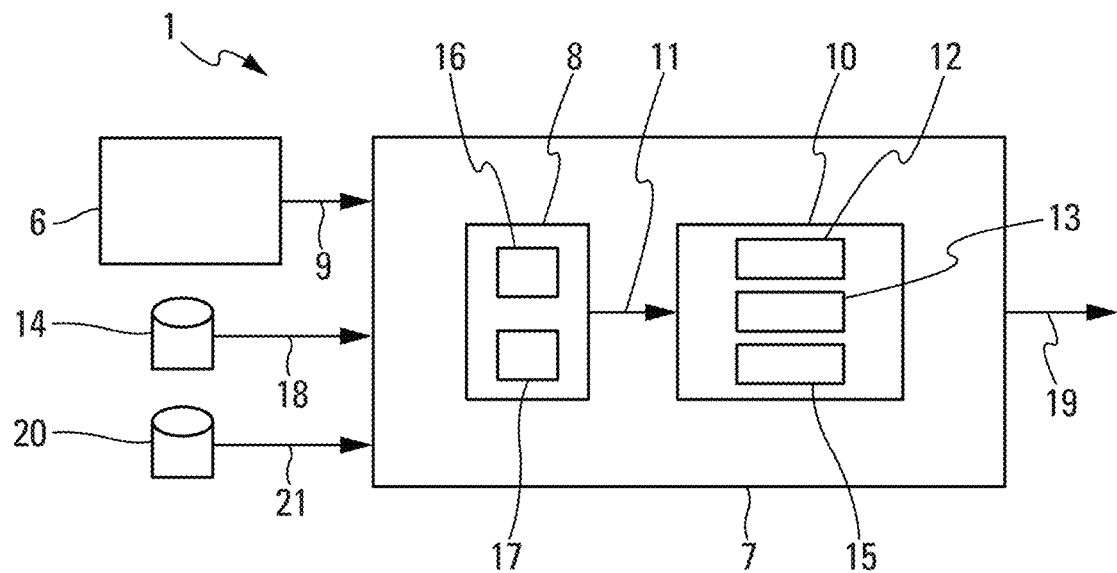
FIG. 1 is a block diagram of a distance estimation device which illustrates a particular embodiment of the invention.

The device 1 comprises, as shown in FIG. 1, a central unit 7 which comprises:
  a detection and identification unit 8 configured to detect and identify at least one target 4 in the image I (received from the image generator 6 via a link 9), from at least one (predetermined) list of known targets (or objects), and to define an imaged representation 22 (FIG. 3) of the identified target 4; and
  a distance estimation unit 10 connected by means of a link 11 to the detection and identification unit 8.

Imaged representation 22 of a target 4 in an image I means the representation (or image part) representing that target 4 in the image I. For simplification purposes, only one target 4 of imaged representation 22 is shown in image I of FIG. 3, the background of the image I being referenced F.

The device 1 further comprises at least one predetermined database 14, containing at least said predetermined list of known targets. In a particular embodiment, the device 1 comprises a set (not shown) of a plurality of databases 14, only one of which is shown in FIG. 1, comprising, for example, different target types respectively.

The known targets may be different versions or different models of the same type of sought vehicle or object, for example a mobile vehicle, in particular land-based, such as a tank 5, a military truck or the like. It can also be different types of targets (tank, transport vehicle, etc.).

In a first embodiment shown in FIG. 1, the database 14 or the set of databases 14 may be arranged outside the central unit 7 and connected to the latter by means of a link 18. Furthermore, in a second embodiment (not shown), the database 14 or the set of databases 14 is integrated into the central unit 7.

The device 1 further comprises at least one predetermined database 20 containing three-dimensional (3D) models of known targets, as specified below. These targets represent the targets taken into account in the database 14. In a particular embodiment, the device 1 comprises a set (not shown) of a plurality of databases 20, only one of which is shown in FIG. 1.

In a first embodiment shown in FIG. 1, the database 20 or the set of databases 20 may be arranged outside the central unit 7 and connected to the latter by means of a link 21. Furthermore, in a second embodiment (not shown), the database 20 or the set of databases 20 is integrated into the central unit 7.

In one embodiment, the device 1 comprises a single database (not shown), and the data from the databases 14 and 20 are integrated into this single database.

In a preferred embodiment, the detection and identification unit 8 comprises:
  a detection unit 16 configured to detect a target 4 in the image I; and
  a recognition and identification unit 17 configured to assign a class to the detected target.

The detection and identification unit 8 thus comprises a processing chain of the DRI type (for "Detection, Recognition and Identification") which has the function of detecting and locating, as well as identifying the objects (or targets) of the database 14 which are possibly present in the image I.

In addition, the distance estimation unit 10 comprises:
  a projection element 12 configured to perform a plurality of different projections of a three-dimensional model of said identified target on the image I in order to obtain projected representations of the target, as detailed below, the projected representations being dependent on characteristics of the image generator 6, each of said projected representations being representative of an associated distance from the target 4 and an associated orientation of the target 4;
  a comparison element 13 configured to compare the imaged representation of the target 4 with each of said projected representations; and
  a selection element 15 configured to select the projected representation most similar to the imaged representation, the distance associated with this selected projected representation representing said estimated distance D between the position of the observer 2 and the target 4.

Furthermore, in a particular embodiment, said device 1 also comprises the image generator 6 which is thus configured to generate at least one image I from the position P1 of the observer 2.

In a preferred embodiment, the image generator 6 is an optoelectronic imager, for example an RGB (for "Red, Green, Blue") camera or an infrared camera.

Furthermore, in a particular embodiment, said device 1 comprises an information transmission unit (not shown) which is configured to transmit at least the estimated distance D (as well as the identity of the target for example) to at least one user system (not shown) via a link 19 (FIG. 1).

The device 1, as described above, implements a distance estimation method P (hereinafter "method") shown in FIG. 9.

Figure 9:
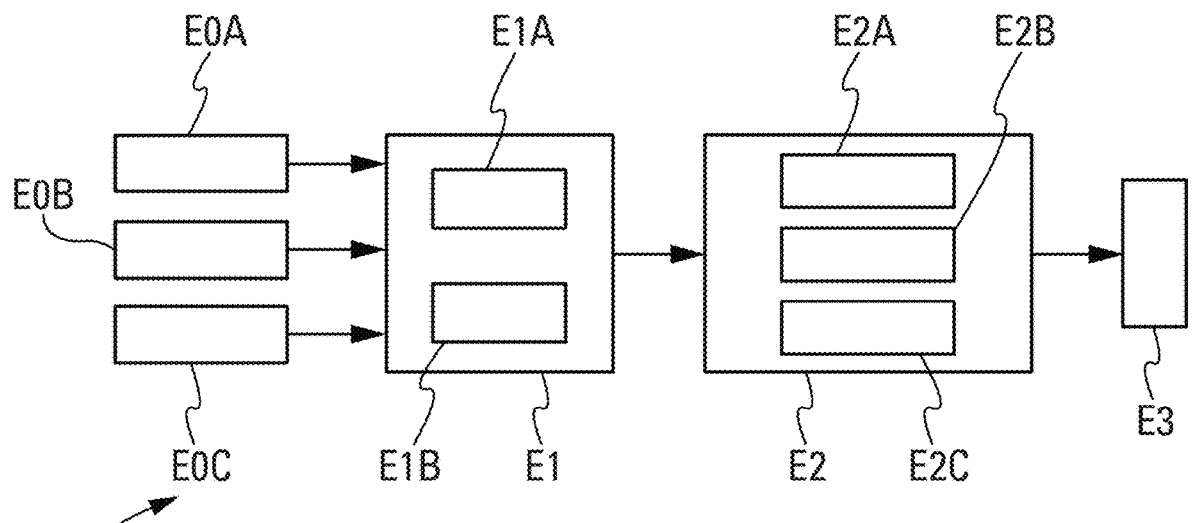
FIG. 9 is a block diagram of a target distance estimation method.

Said method P comprises, as shown in FIG. 9, a sequence of steps E1 and E2 comprising:
  a detection and identification step E1, implemented by the detection and identification unit 8, consisting in detecting and identifying at least one target 4 in the image I generated by the image generator 6. The identification consists in finding in the image I at least one target 4 corresponding to one of the targets included in the list of known targets contained in the database 14; and
  a distance estimation step E2, implemented by the distance estimation unit 10.

Said method P also comprises, as shown in FIG. 9, an information transmission step E3, implemented after the distance estimation step E2, consisting in transmitting at least the estimated distance D (as well as the identity of the target for example) to at least one user system.

In a preferred embodiment, the detection and identification step E1 comprises:

a detection sub-step E1A, implemented by the detection unit 16, consisting in detecting a target 4 in the image I; and a recognition and identification sub-step E1B, implemented by the recognition and identification unit 17, consisting in assigning to the target 4 detected in the image I, a recognition class or an identification class, specified below.

The detection sub-step E1A consists in performing one of the following operations on the image: identifying the pixels of the outline of the target or the pixels of the target or generating a bounding box encompassing the target.

Figure 4:
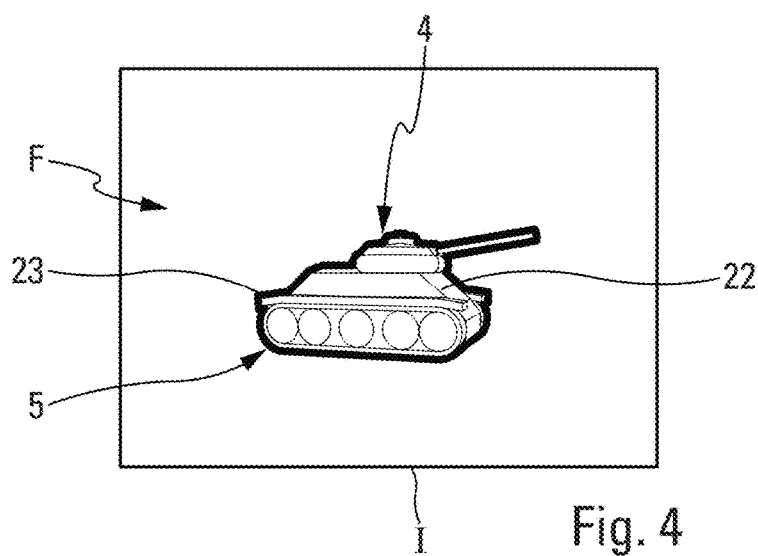
FIG. 4 shows a first example of identification of a target in an image.
Figure 5:
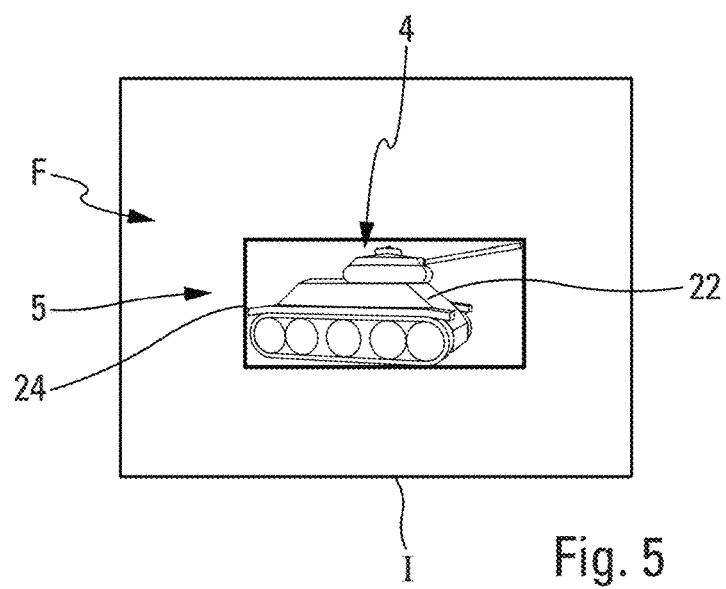
FIG. 5 shows a second example of identification of a target in an image.

The detection sub-step E1A aims to segment the target 4 finely, i.e. to distinguish it from the background F of the image I (FIGS. 4 and 5).

To this end, in a first embodiment shown in FIG. 4, the detection sub-step E1A identifies the pixels belonging to the outline 23 of the target 4, as highlighted by a thick line in FIG. 4.

Furthermore, in a second embodiment shown in FIG. 5, the detection sub-step E1A generates a bounding box 24, preferably rectangular in shape, which encompass the target 4. The bounding box 24 is the smallest surface box adapted to completely encompass the target 4.

The purpose of the detection and identification step E1 is thus to detect and locate, as well as to identify the targets of the database 14, possibly present in the image I.

This detection and identification step E1 thus comprises two main functions (or sub-steps), namely:

the detection sub-step E1A, the purpose of which is to segment the target 4 finely in the image I, i.e. to distinguish it from the background F of the image I; and the recognition and identification sub-step E1B, the purpose of which is to assign to any target 4 (detected in the image I at the detection sub-step E1A) a recognition class (corresponding to a level of knowledge linked to the category of the target; for example, a car which is distinguished from a pedestrian) or an identification class (corresponding to a level of knowledge more precise than the recognition class; for example, if it is a car or a tank, the knowledge of its precise model).

In both sub-steps E1A and E1B, the methods considered for performing the functions are based on machine learning techniques. The machine learning uses models built beforehand during a learning phase. This learning phase is performed offline, i.e. it is implemented only once before using the device 1 in a second online (or test) phase on observation images. During this phase, a learning algorithm builds models that are then used in the test phase.

They are called classification models because they allow the device to classify the target examples extracted from the observed scene:

in the case of the detection, into known or unknown targets (or background examples); and in the case of the recognition and the identification, into different categories (or models or versions) of known targets.

The method P comprises at least one learning step EOA, implemented prior to the detection and identification step E1, consisting in generating the (classification) models stored in the database 14.

The proposed learning algorithm uses to build the models, a base of example images, whose ideal response by the classification models (detection and recognition and identification classes) is known. The classes are predetermined. This is called tagged data. Such a learning technique using data labeled by an expert is referred to as supervised learning. The base of labeled images used by the learning is referred to as the training database. It can potentially comprise a large number of images.

Figure 10:
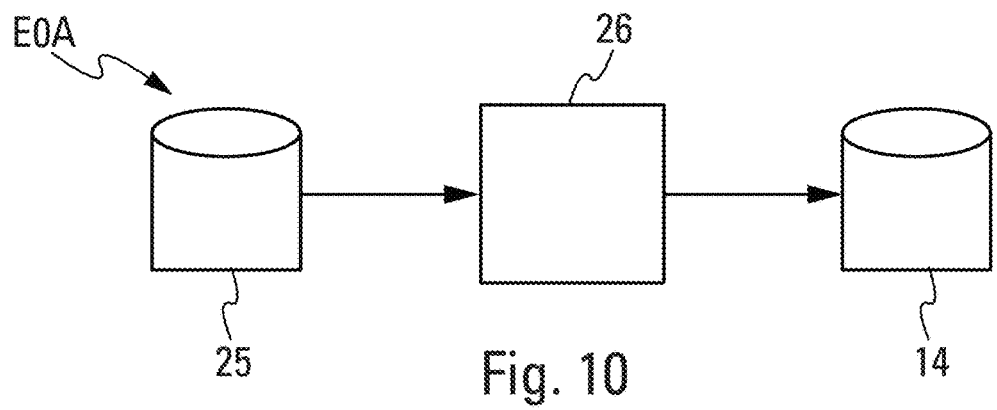
FIG. 10 is the block diagram of a supervised learning of classification models.

FIG. 10 shows the learning step EOA. Specifically, from a training database 25, a supervised learning of IRD classification models (reference 26) is implemented so as to generate the models to be stored in the database 14.

By way of illustration, we can cite some examples of supervised learning-based algorithms that can be used in the learning step EOA (FIGS. 9 and 10):

Support Vector Machine (SVM) algorithms, associated with a visual descriptor, e.g. Histogram of Oriented Gradient (HOG);

algorithms based on decision tree forest (random forest classifiers);

convolutional neural networks, in particular deep learning, which present solutions allowing to produce classifiers by learning.

Therefore, the inputs to the detection and identification unit 8 (implementing the detection and identification step E) are as follows:

an observation digital image I of the scene (containing the target 4), in which it is desired to measure the distance of one or more targets, which image I is received from the image generator 6 by means of the link 9; and IRD models of known targets, which have been obtained by machine learning, which are contained in the database 14 and which are received by means of the link 18.

The outputs of the detection and identification unit 8 (implementing the detection and identification step E1), which are transmitted to the distance estimation unit 10, are as follows:

a segmentation of the target, namely the lists of the pixels belonging to the target or the lists of the pixels belonging to the outline 23 of the target 4 (FIG. 4) or the coordinates of the bounding box 24 of the target 4 (FIG. 5); and a label assigned to the target 4 in the recognition and identification sub-step E1B.

The detection and identification unit 8 thus provides a segmentation of the target 4 and its label in the database 14.

The processing described in the present description for estimating the distance of a target 4 identified in an image I can of course be implemented (in a similar manner each time) for estimating the distances of each of a plurality of targets, in the case where several (known) targets are identified in the image I.

Once the target is finely located in the image I and identified, the method P comprises the distance estimation step E2 implemented by the distance estimation unit 10.

The distance estimation step E2 comprises a projection sub-step E2A, implemented by the projection element 12, consisting in performing on the image I a plurality of different projections of a three-dimensional model of said identified target 4. FIGS. 6A and 6B show two perspective views of the target 4, in this case a tank 5, allowing to define a model M (in three dimensions) of said target 4. In a preferred embodiment (not shown), each model M of a target is the geometric representation of the target as polygons in space.

This plurality of different projections of the model M (in three dimensions) on the image I allows to obtain projected representations 29 and 30 of the target 4, as represented in FIGS. 7 and 8. Each of said projected representations 29 and 30 is thus a two-dimensional (2D) representation by projection on the image I. These projected representations 29 and 30 depend on characteristics of the image generator 6, and more particularly on the spatial resolution of said image generator 6, namely the angular value of the angle of view (or viewing angle) in the reality which corresponds to the length of a pixel in the image I generated by said image generator 6.

Each of said projected representations 29 and 30 is representative of a particular given (associated) distance of the target 4 with respect to the image generator 6 and a particular given (associated) orientation of the target 4 in space. The orientation can be changed by moving the model M around and/or along one of the X, Y and Z directions of a frame of reference R represented illustratively in FIG. 6A.

The distance estimation step E2 also comprises a comparison sub-step E2B, implemented by the comparison element 13, consisting in comparing the imaged representation 22 of the target 4 with each of said projected representations 29 and 30, as shown for the projected representation 29 in FIG. 7 and for the projected representation 30 in FIG. 8.

Furthermore, the distance estimation step E2 comprises a selection sub-step E2C, implemented by the selection element 15, consisting in selecting, among the set of projected representations 29 and 30 compared in the comparison step E2B to the imaged representation 22, the projected representation most similar to said imaged representation 22, namely the projected representation 30 in our example.

To this end, in a preferred embodiment, the comparison sub-step E2B assigns a score to each of said projected representations 29 and 30, based on the quality of the match, and the selection sub-step E2C selects the projected representation with the best score, where the better the match (or the quality of the match) the higher the score.

The quality of the match (for a given or considered projected representation) is the result of the measurement of the integration (along the outline of the considered projected representation) of the distance between the outline of the imaged representation and the outline of said considered projected representation. In order to have a good match and thus a high score, it is convenient to have a distance (integrated along the outline) between the two outlines (of the imaged representation and of the projected representation) as small as possible, i.e. the projected representation should be as similar as possible to the imaged representation.

The distance associated with the selected projected representation 30 represents said estimated distance D between the position of the image generator 6 (and thus the observer 2) and that of the target 4.

The distance estimation step E2 thus consists in comparing the target 4 observed in the pixels of the image I (imaged representation 22) with a geometric modeling of this target 4 (comprising its shape in three dimensions and the measurements of its dimensions in meters). By comparing the pixel dimensions of the imaged representation 22 of the target 4 with the dimensions in meter of its geometric model, an estimation of the distance between the target 4 and the observer 2 can be produced, knowing the angular resolution of the image generator 6.

The distance estimation step E2 is based on the use of 3D models of known targets. Therefore, a 3D model is available for each of the targets in the knowledge base (database 14), which we have been able to segment and identify, and which we wish to range. We use a transformation of the 3D model whose parameters provide an estimation of the distance sought. A transformation of this model is used, depending on the observation image of the target that is being processed. This transformation is the projection of the 3D model into the image. This is the projection of the target in 3D, the result of which is the image of this target seen by the image generator 6 if it had been in the observed scene at a certain (associated) distance and with a certain (associated) orientation. The parameters of this projection are therefore the geometric characteristics of the image generator 6 used, the orientation (or pose) in space of the model, and the distance at which the target thus observed would be located. The result of this projection is a two-dimensional profile (or outline or silhouette) in the image I, corresponding to said projected representations 29 and 30.

The model is therefore projected according to different orientation and distance parameters in order to obtain a profile (or outline) of the projected model that is as close as possible to the profile (or outline) of the target actually observed in the image I (imaged representation 22). The best projection is therefore sought, which also requires the construction of a score for this projection to assess the extent to which the projected profile corresponds to the observed target. The best projection score obtained after exploring several projection parameters provides the likely distance between the target and the observer. In other words, the best set of parameters (distance, orientation) obtained provides the distance estimation.

Preferably, the 3D models are geometric representations of the known targets as polygons in space. They are built from the knowledge of the geometry of the targets in the database 14.

The method P also comprises at least one generation step EOB, implemented prior to the detection and identification step E1, consisting in generating said 3D models stored in the database 20.

Figure 11:
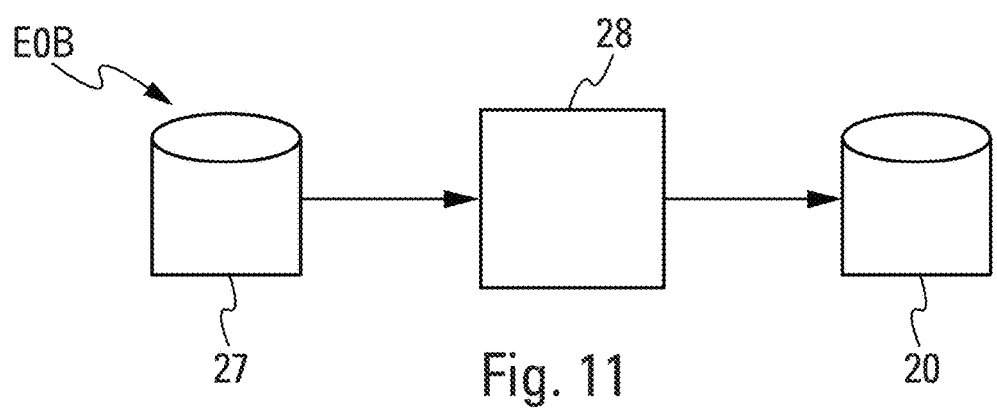
FIG. 11 is a block diagram of a method for generating three-dimensional models of known targets.

FIG. 11 illustrates the generation step EOB. More precisely, from a database 27, a 3D model generation (or construction) (reference 28) is implemented so as to generate the 3D models to be stored in the database 20. This model generation consists in building these models from three-dimensional plans of the targets in the database 14 using a three-dimensional polygonal modeling tool (for example, a 3D modeling software classically used in the field of three-dimensional computer graphics). The fineness of the mesh of the polygons used by these models must allow for a sufficiently accurate distance estimation during the projection sub-step. Moreover, these models can undergo special processing in order to give them topological properties that guarantee the feasibility of the projection used by the device.

The method P, as described above, can be implemented in two different ways.

In a first embodiment, it is implemented fully automatically.

In a second embodiment, the detection and identification step E1 is implemented semi-automatically (with an intervention of an operator). In this case, the operator imposes or corrects the segmentation and/or the identification of the target. In addition, the distance estimation step E2 is implemented automatically.

The method P also comprises at least one image generation step EOC, implemented prior to the detection and identification step E1, consisting in generating at least one image I using the image generator 6 from the position P1 of the observer 2.

In a particular embodiment, the device 1 comprises additional distance calculation elements (not shown) based on several techniques used in parallel. The generated result (estimated distance) is obtained, in this embodiment, from a combination (average, etc.) of the results of these different techniques. The complementarity of the different techniques can thus be used to improve the overall robustness and accuracy of the estimation of the distance.

The method P thus allows to estimate the distance D between a target 4 observed in a digital image I and the image generator 6 (which generated this digital image I) which is geometrically characterized (calibrated). More particularly, the processing chain implemented by the method P allows a distance measurement between the known observed target and the observer, from a single image (a single camera, at a given time) and without electromagnetic emissions intended to illuminate the target (passive system).

The method P allows to estimate, automatically and without contact, the distance separating a target and its observer without the latter having to move, by means of a passive optical system (image generator 6).

In summary, the method P is limited to the measurement of the distance between the observer 2 and a set of previously known and geometrically characterized targets 4. For this purpose, a database of targets is available, the dimensions of which are known in particular, and an attempt is made to measure the distance D between the observer 2 and these targets 4 when they are observed in a digital image I resulting from the image generator 6 used. The image generator 6 is calibrated. In particular, its angular resolution is known. When the observation image I is generated, it is subjected to a processing chain (method P), having two main steps.

The method P (of distance estimation), as described above, has the following advantages in particular:
- it is passive and requires only one image generator (or imager) that is calibrated and at least one database 14 containing observed targets;
- it provides a passive, undetectable (stealth) solution, unlike active solutions;
- it is simple to implement;
- it does not need any particularly specific equipment. It uses a monocular (single imager) hardware device that is not bulky, inexpensive, relatively simple and non-specialized; and
- it performs the distance measurement by means of automatic image processing based mainly on geometric aspects and not requiring a complex atmospheric transmission model. Its implementation does not require knowledge of an atmospheric absorption model.

The invention claimed is:

1. A method for estimating a distance between a position of an observer and a target, using at least one image (1) generated by a digital image generator (6) from a position (P1) of the observer (2), comprising a sequence of steps comprising:
    a detection and identification step (E1) consisting in detecting and identifying at least one target (4) in the image (I), from at least one list of known targets, and in defining an imaged representation (22) of the identified target (4); and
    a distance estimation step (E2), the distance estimation step (E2) comprising a projection sub-step (E2A) consisting in performing on the image (1) a plurality of different projections of a three-dimensional model (M) of said identified target (4) in order to obtain projected representations (29, 30) of the target (4), said projected representations (29, 30) depending on characteristics of the image generator (6), each of said projected representations (29, 30) being representative of an associated distance of the target (4) and an associated orientation of the target (4), a comparison sub-step (E2B) consisting in comparing the imaged representation (22) of the target (4) to each of said projected representations (29, 30), the comparison sub-step (E2B) consisting in assigning a score to each of said projected representations (29, 30) according to the quality of the match, the quality of the match corresponding to the measure of an integration, along the outline of the projected representation (29, 30) of the distance between the outline of the imaged representation (22) and the outline of said projected representation (29, 30), and a selection sub-step (E2C) consisting in selecting the projected representation (30) with the best score, the distance associated with that selected projected representation (30) representing said estimated distance (D) between the position of the observer (2) and the target (4).

2. The method according to claim 1, wherein the detection and identification step (E1) comprises:—a detection sub-step (E1A) consisting in detecting at least one target (4) in the image (1); and—a recognition and identification sub-step (E1B) consisting in assigning a class to the detected target (4).

3. The method according to claim 2, wherein the detection sub-step (E1A) consists in performing one of the following operations on the image (1): identifying pixels of the target (4), identifying pixels of an outline (23) of the target (4), generating a bounding box (24) encompassing the target (4).

4. The method according to claim 2, wherein the class is one of the following classes: a recognition class, an identification class.

5. The method according to claim 1, wherein the detection and identification step (E1) implements a machine learning using classification models.

6. The method according to claim 5, wherein it comprises at least one learning step (E0A), implemented prior to the detection and identification step (E1), consisting in generating said classification models.

7. The method according to claim 1 wherein said three-dimensional models (M) of targets (4) are geometric representations of the targets (4) as polygons in space.

8. The method according to claim 1, wherein it comprises at least one generation step (E0B), implemented prior to the detection and identification step (E1), consisting in generating said three-dimensional models (M).

9. The method according to claim 6, wherein said learning step (E0A) implements one of the following algorithms:—at least one support vector machine algorithm;—at least one algorithm based on a decision tree forest;—at least one convolutional neural network.

10. The method according to claim 1, wherein it further comprises at least one of the following steps:—an image generation step (E0C), implemented prior to the detection and identification step (E1), consisting in generating at least one image (1) using the image generator (6) from the position (P1) of the observer (2);—an information transmission step (E3), implemented after the distance estimation step (E2), consisting in transmitting at least the estimated distance (D) to at least one user system.

11. The method according to claim 1, wherein it is implemented automatically.

12. The method according to claim 1, wherein the detection and identification step (E1) is implemented semi-automatically, and in that the distance estimation step (E2) is implemented automatically.

13. A device for estimating a distance between a position of an observer and a target, using at least one image (1) generated by a digital image generator (6) from a position (P1) of the observer (2), comprising:

a detection and identification unit (8) configured to detect and identify at least one target (4) in the image (I), from at least one list of known targets, and to define an imaged representation (22) of the identified target (4); and a distance estimation unit (10) configured to:

perform, on the image (I), a plurality of different projections of a three-dimensional model (M) of said identified target (4) to obtain projected representations (29, 30) of the target (4), the projected representations (29, 30) being dependent on characteristics of the image generator (6), each of said projected representations (29, 30) being representative of an associated distance of the target (4) and an associated orientation of the target (4);

compare the imaged representation (22) of the target (4) with each of said projected representations (29, 30), by assigning a score to each of said projected representations (29, 30) according to the quality of the match, the quality of the match corresponding to the measure of an integration, along the outline of the projected representation (29, 30), of the distance between the outline of the imaged representation (22) and the outline of said projected representation; and—select the projected representation (30) with the best score, the distance associated with this selected projected representation (30) representing said estimated distance (D) between the position of the observer (2) and the target (4).

14. The device according to claim 13, wherein it further comprises at least one of the following elements:—at least one predetermined database (14, 20) containing at least said list of known targets (4) and/or said three-dimensional models (M);—the digital image generator (6) configured to generate at least one image (I) from the position (P1) of the observer (2);—an information transmission unit configured to transmit at least the estimated distance (D) to at least one user system.

* * * * *